May 31, 1932.   J. H. ROBERTSON   1,860,621
VARIABLE FRICTION GEARING
Filed May 24, 1929

Inventor:
John Hogg Robertson
By
Pennie Davis Marvin & Edmonds
attorneys

Patented May 31, 1932

1,860,621

UNITED STATES PATENT OFFICE

JOHN HOGG ROBERTSON, OF LONDON, ENGLAND

VARIABLE FRICTION GEARING

Application filed May 24, 1929, Serial No. 365,682, and in Great Britain May 30, 1928.

This invention relates to continuously variable friction gearing of the type in which a driven member is adapted to make face contact with a driving member, a direct drive position being provided in which the two members engage co-axially, in the manner of a disc or cone clutch, and a series of indirect drive positions being provided in which one member is displaced laterally to a variable extent so that contact takes place at points (or limited areas) of which the respective radial distances from the axes of the two members are unequal.

In my co-pending patent application Serial No. 291,122, I have described and claimed an improved arrangement of a variable friction gearing of the above type, in which the position of the laterally displaceable member is controlled automatically in accordance with the magnitude of the torque transmitted, so as to vary the ratio of the gearing to suit the conditions of operation.

The object of the present invention is to provide means for controlling the position of the driven member of the friction gearing, said controlling means being operated by the torque reaction of an indirectly driven part, for example the rear axle of an automobile vehicle to which power is transmitted from the driven member of the friction gearing through a propeller shaft or the like and bevel or worm gearing. Such indirectly driven part can conveniently be provided with a torque member extending in a direction substantially parallel to the driven shaft of the friction gearing, the extremity of the torque arm being attached to the support or housing in or upon which the driven member is itself journaled.

The invention is hereafter described with reference to the accompanying drawings, in which:—

The driven member of the friction gearing is constructed in the form of a wheel $a$ carrying an annular friction surface $a^1$ adapted to contact with the coned end face $b^1$ of an axially slidable driving disc $b$, the wheel being supported by a radius arm $c$ pivoted upon an axis $d$ to one side of and parallel to the axes of the two members, as described in my said co-pending patent application Serial No. 291,122. The shaft of the driven wheel is mounted in a bearing $e^1$ upon the radius arm $c$ and its rear end is connected by a propeller shaft $f$ provided with universal joints $f^1 f^2$ to the rear axle $g$ of the motor car, with a final drive by bevel gearing $h\ h^1$. The rear axle casing $g^1$ is fitted with a torque tube $i$ extending forward around the propeller shaft $f$, the front end $i^1$ of this torque tube being provided with a ball journal bearing $i^2$ upon the shaft $f$.

The propeller shaft is thus subjected to an upward load at the bearing $i^2$ during forward drive of the vehicle, this load being transmitted through the universal joint $f^1$ to the radius arm $c$, in such a manner that the torque reaction of the back axle during forward travel of the car tends to raise the radius arm $c$ and thereby keep the friction gear in the position of indirect drive with the driven wheel $a$ lifted to its maximum lateral displacement. An auxiliary spring control is also provided, consisting of a laminated cantilever spring $j$ anchored to the frame at $j^1$ and likewise tending to keep the friction gear in the indirect drive position, this spring $j$ being intended mainly to take the weight of the driven member $a$ and radius arm $c$ when the vehicle is at rest.

Figure 1:
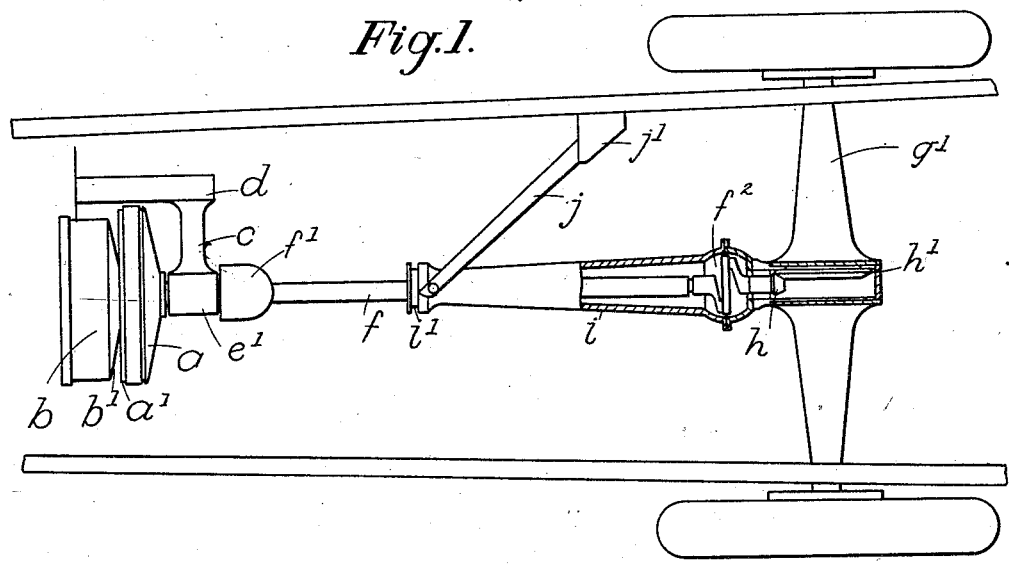
Figure 1 is a plan view of the rearward portion of the chassis of a light motor vehicle embodying the present invention.
Figure 2:
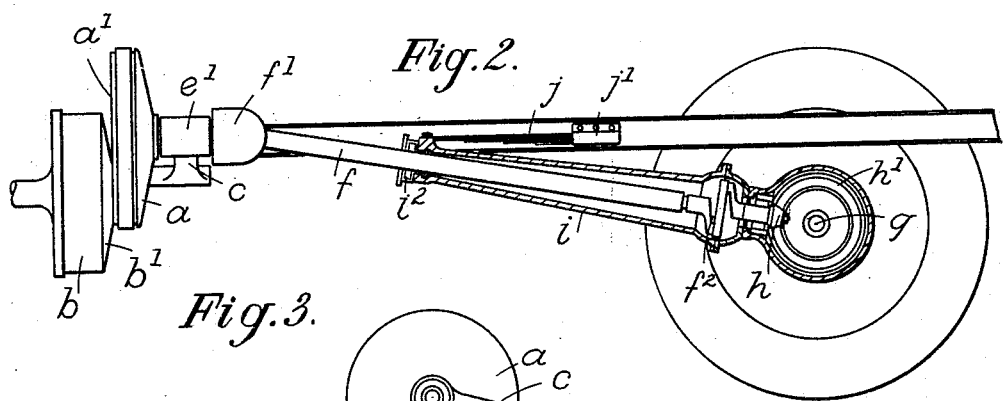
Figure 2 is a corresponding side elevation.
Figure 3:
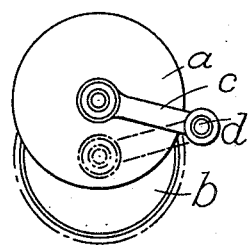
Figure 3 is a detail showing the driven member of the friction gearing in two alternative positions relative to the driving member.

When the driving disc $b$ is advanced axially into contact with the wheel $a$, its movement tends to force down the wheel $a$ and radius arm $c$, so as to bring the two members of the friction gearing into coaxial relation, as seen in dotted lines in Figure 3. Such movement is resisted by the torque member $i$ to an extent dependent upon the reaction of the back axle, but in proportion as this reaction (that is, the resistance to forward motion of the car) diminishes, so the torque tube allows the driven wheel *a* to move down towards the direct drive position. Conversely, when the friction gearing is in the direct drive position, any increase in the resistance to movement of the car will tend to cause the torque member to displace the driven wheel *a* upwards away from the coaxial position, thereby lowering the gear ratio to meet the altered conditions.

Figure 4:
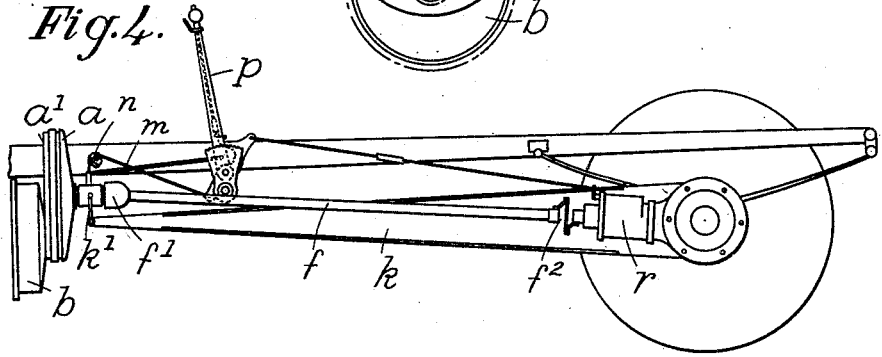
Figure 4 is a side elevation of a modified arrangement.

The curvature of the path of the axis of the driven wheel during its lateral (upward and downward) displacement controlled by the radius arm may be compensated if desired, but in the particular arrangement illustrated the amount of the curvature is so small as to require no special provision. Should it be necessary however the torque member may be allowed to swing laterally, the said member being arranged as an arm *k* having its rear end flattened in the vertical plane, as illustrated in Figure 4, this arm lying beside the propeller shaft *f* and approximately parallel to the latter, having its forward end attached to the radius arm *c* by means of a ball mounted link $k^1$ to apply the upward or downward pressure for producing the lateral displacement of the driven member.

The torque member controlling the friction gear need not necessarily be a rigid member capable of withstanding the entire torque of the back axle, as in the case of the torque tube upon cars having the propeller shaft enclosed, but may be a relatively light structure merely of sufficient stiffness to produce the lateral (upward) displacement of the driven member *a*, the actual driving torque being supported by the vehicle springs, for example in the well known manner, so that the torque member simply moves in accordance with the magnitude of the reaction, without attempting to withstand it.

Where a reverse drive is required upon occasion, as in a motor car, provision may be made for suppressing the automatic control by torque reaction under such conditions. For example, as illustrated in Figure 4, if a reverse gear is incorporated at *r* in the rear axle *g*, with a hand lever *p* for engaging the reverse as in my copending application Serial No. 291,122, the operation of this lever may be arranged to cause a cable *m* running over one or more guide pulleys *n* to lift up the radius arm *c* and hold the driven wheel *a* in the low gear position so long as the reverse is in use.

It will be understood that the invention is not limited to the particular arrangement described; for example, the torque reaction of the indirectly driven part may be transmitted to the radius arm through any suitable means according to the particular form of drive employed.

I claim:

1. A variable friction gearing, comprising a driving member, a driven member, a radius arm supporting said driven member, said radius arm having a fulcrum axis parallel to the axis of said driving member, the movement of said radius arm in one direction about said fulcrum axis causing said driven member to pass from a position coaxial with said driving member to an eccentric position, a rotary part connected to and driven indirectly by said driven member, and means operated by the torque reaction of said indirectly driven part for controlling the movement of said radius arm.

2. A variable friction gearing, comprising a driving member, a driven member, said driven member being displaceable laterally to a position eccentric to said driving member, a shaft connected to said driven member, gears driven by said shaft, a rotary part driven by said gears, and means for controlling the position of said driven member by the torque reaction of said gear driven part.

3. In an automobile vehicle, the combination of a variable friction gearing comprising driving and driven members mounted on parallel axes and having conical engaging surfaces, said driven member being displaceable laterally from a position co-axial of said driving member to a position eccentric thereto, with a driven axle, driving means for said axle, said driving means connected to the driven member of said friction gearing, and means for controlling the position of displacement of said driven member by the torque reaction of said driven axle.

4. In an automobile vehicle, the combination of a variable friction gearing comprising driving and driven members mounted on parallel axes and having conical engaging surfaces, said driven member being displaceable laterally from a position coaxial of said driving member to a position eccentric thereto, with a driven axle, driving means for said axle including a pinion connected to the driven member of said friction gearing, a torque resisting member secured to said driven axle, and means for controlling the position of displacement of said driven member by said torque resisting member.

5. In an automobile vehicle, the combination of a variable friction gearing comprising driving and driven members mounted on parallel axes and having conical engaging surfaces, said driven member being displaceable laterally from a position coaxial of said driving member to a position eccentric thereto, with a driven axle, driving means for said axle including a driving pinion, a propeller shaft connecting the driven member of said friction gearing to the driving pinion of said driven axle, a torque resisting tubular member secured to said driven axle substantially coaxial with said propeller shaft, and means for controlling the eccentricity of said driven member by said tubular member.

6. In an automobile vehicle, the combination of a variable friction gearing comprising driving and driven members, and a radius arm supporting said driven member, said radius arm having a fulcrum axis parallel to the axis of said driving member, and the movement of said radius arm in one direction about said fulcrum axis causing said driven member to pass from a position coaxial with said driving member to an eccentric position, with a driven axle, means for driving said axle, said driving means connected to the driven member of said friction gearing, and means for controlling the movement of said radius arm by the torque reaction of said driven axle.

7. In an automobile vehicle, the combination of a variable friction gearing comprising driving and driven members, and a radius arm supporting said driven member, said radius arm having a fulcrum axis parallel to the axis of said driving member, and the movement of said radius arm in one direction about said fulcrum axis causing said driven member to pass from a position coaxial with said driving member to an eccentric position, with a driven axle, means for driving said axle including a driving pinion, a propeller shaft connecting the driven member of said friction gearing to the driving pinion of said driven axle, a torque resisting tubular member secured to said driven axle substantially coaxial with said propeller shaft, and means for controlling the movement of said radius arm by said tubular member.

8. In an automobile vehicle, the combination of a variable friction gearing comprising a driving member, a driven member, a radius arm supporting said driven member, said radius arm having a fulcrum axis parallel to the axis of said driving member and to one side thereof, the movement of said radius arm in one direction about said fulcrum axis causing said driven member to pass from a position coaxial with said driving member upwards towards an eccentric position, with a driven axle, means for driving said axle including a driving pinion, a propeller shaft connecting the driven member of said friction gearing to the driving pinion of said driven axle, a torque resisting tubular member secured to said driven axle substantially coaxial with said propeller shaft, means for controlling the movement of said radius arm by the torque reaction of said driven axle transmitted to said tubular member, and means for partially balancing the weights of said tubular member, propeller shaft, driven member and radius arm.

In testimony whereof I have signed my name to this specification.

JOHN HOGG ROBERTSON.